US011850560B2

(12) United States Patent
Liu et al.

(10) Patent No.: US 11,850,560 B2
(45) Date of Patent: *Dec. 26, 2023

(54) POLYMER DISPERSION SYSTEM FOR USE IN A HYDRAULIC FRACTURING OPERATION

(71) Applicant: ZL EOR Chemicals Ltd., Vancouver (CA)

(72) Inventors: Fang Fang Liu, Vancouver (CA); Songyin Liu, West Vancouver (CA)

(73) Assignee: ZL EOR CHEMICALS LTD., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/908,866

(22) PCT Filed: Mar. 3, 2021

(86) PCT No.: PCT/CA2021/050281
§ 371 (c)(1),
(2) Date: Sep. 1, 2022

(87) PCT Pub. No.: WO2021/174360
PCT Pub. Date: Sep. 10, 2021

(65) Prior Publication Data
US 2023/0087372 A1    Mar. 23, 2023

Related U.S. Application Data

(63) Continuation of application No. 17/093,512, filed on Nov. 9, 2020, now Pat. No. 11,148,106, which is a continuation-in-part of application No. 16/809,398, filed on Mar. 4, 2020, now abandoned.

(51) Int. Cl.
| | |
|---|---|
| *B01F 25/312* | (2022.01) |
| *B01F 23/50* | (2022.01) |
| *B01F 35/90* | (2022.01) |
| *B01F 35/21* | (2022.01) |
| *B01F 35/22* | (2022.01) |
| *B01F 35/221* | (2022.01) |
| *B01F 35/75* | (2022.01) |
| *B01F 35/71* | (2022.01) |
| *B01F 25/00* | (2022.01) |
| *B01F 101/49* | (2022.01) |
| *E21B 43/26* | (2006.01) |
| *C09K 8/68* | (2006.01) |

(52) U.S. Cl.
CPC ........ *B01F 25/31243* (2022.01); *B01F 23/50* (2022.01); *B01F 35/2112* (2022.01); *B01F 35/2206* (2022.01); *B01F 35/2217* (2022.01); *B01F 35/71745* (2022.01); *B01F 35/71775* (2022.01); *B01F 35/71805* (2022.01); *B01F 35/7544* (2022.01); *B01F 35/90* (2022.01); *C09K 8/68* (2013.01); *E21B 43/2607* (2020.05); *B01F 2025/913* (2022.01); *B01F 2035/99* (2022.01); *B01F 2101/49* (2022.01)

(58) Field of Classification Search
CPC .............. B01F 15/0294; B01F 15/0202; B01F 15/0238; B01F 5/043; B01F 15/026; B01F 15/0251; B01F 15/00155; B01F 15/00422; B01F 15/06; B01F 15/0283; B01F 15/00311; B01F 3/12; B01F 2015/062; B01F 2215/0081; B01F 2005/0017; B01F 25/31243; B01F 23/50; B01F 35/2112; B01F 35/2206; B01F 35/2217; B01F 35/71745; B01F 35/71775; B01F 35/71805; B01F 35/7544; B01F 35/90; B01F 2025/913; B01F 2035/99; B01F 2101/49; B65G 33/22; E21B 43/2607; C09K 8/68
USPC ..... 366/64, 66, 186, 192, 178.1–178.3, 323, 366/167.1, 182.4, 152.6, 163.2, 182.2; 222/285, 290; 406/60; 414/218
See application file for complete search history.

(56) References Cited

U.S. PATENT DOCUMENTS

| | | | |
|---|---|---|---|
| 3,298,669 A | | 1/1967 | Zingg |
| 3,741,533 A | * | 6/1973 | Winn, Jr. ................ B01F 25/21 366/136 |
| 4,007,921 A | | 2/1977 | Zingg |
| 4,077,612 A | | 3/1978 | Ricciardi |
| 4,141,656 A | | 2/1979 | Mian |
| 4,186,772 A | | 2/1980 | Handleman |
| 4,426,156 A | | 1/1984 | Adamo et al. |
| 4,531,673 A | | 7/1985 | Holland et al. |
| 4,643,582 A | | 2/1987 | Ricciardi |
| 4,884,925 A | | 12/1989 | Kemp et al. |
| 5,190,374 A | | 3/1993 | Harms et al. |
| 5,344,619 A | | 9/1994 | Larwick et al. |

(Continued)

FOREIGN PATENT DOCUMENTS

| | | |
|---|---|---|
| CN | 201416432 Y | 3/2010 |
| CN | 105756638 A | 7/2016 |

(Continued)

*Primary Examiner* — Charles Cooley
(74) *Attorney, Agent, or Firm* — McMillan LLP

(57) ABSTRACT

A polymer dispersion system for use in a hydraulic fracturing operation is disclosed. The system comprises (a) a tank assembly comprising an ingress, an egress, and an interior volume for collecting mother solution; (b) a first transfer pump coupled with the egress of the tank assembly: and (c) a second transfer pump coupled with the egress of the tank assembly. The first transfer pump is configured for coupling to a missile unit and a blender unit downstream thereof, but in fluid communication with only one of such units at any given time when coupled. A method of operating said polymer dispersion system is also disclosed.

20 Claims, 2 Drawing Sheets

(56) References Cited

U.S. PATENT DOCUMENTS

| | | | |
|---|---|---|---|
| 5,382,411 A | 1/1995 | Allen | |
| 5,383,725 A | 1/1995 | Swisher, Jr. et al. | |
| 5,426,137 A | 1/1995 | Allen | |
| 5,660,466 A * | 8/1997 | Hopson | B01F 25/721 239/113 |
| 5,857,773 A | 1/1999 | Tammelin | |
| 5,887,976 A * | 3/1999 | Komori | B29B 7/44 366/326.1 |
| 6,039,470 A | 3/2000 | Conwell | |
| 6,045,255 A | 4/2000 | Ogier | |
| 6,190,461 B1 | 2/2001 | Alack | |
| 6,565,755 B1 * | 5/2003 | Holdsworth | C02F 11/12 210/197 |
| 6,796,704 B1 | 9/2004 | Lott | |
| 6,979,116 B2 | 12/2005 | Cecala et al. | |
| 6,988,823 B2 | 1/2006 | Wilson | |
| 7,581,872 B2 | 9/2009 | Allen | |
| 7,740,399 B2 * | 6/2010 | Simmons | B01F 35/8821 366/153.1 |
| 7,794,135 B2 * | 9/2010 | El Kholy | B01F 25/10 366/173.2 |
| 7,901,571 B2 | 3/2011 | Woods et al. | |
| 9,067,182 B2 | 6/2015 | Nichols et al. | |
| 11,148,106 B2 * | 10/2021 | Liu | B01F 35/71805 |
| 11,781,409 B2 * | 10/2023 | Anders | E21B 43/26 166/308.1 |
| 2002/0057625 A1 | 5/2002 | Russell et al. | |
| 2003/0161212 A1 * | 8/2003 | Neal | B01F 33/502 366/27 |
| 2005/0111298 A1 | 5/2005 | Lott | |
| 2010/0220549 A1 * | 9/2010 | Holdsworth | B65G 53/48 366/167.1 |
| 2015/0322761 A1 * | 11/2015 | Hodgson | B01F 35/71805 166/308.1 |
| 2020/0291731 A1 * | 9/2020 | Haiderer | E21B 43/2607 |
| 2021/0275978 A1 * | 9/2021 | Liu | B01F 23/59 |

FOREIGN PATENT DOCUMENTS

| | | |
|---|---|---|
| CN | 106536031 A | 3/2017 |
| CN | 207708936 U | 8/2018 |
| WO | 2008107492 A1 | 9/2008 |
| WO | 2010020698 A2 | 2/2010 |
| WO | 2011107683 A1 | 9/2011 |

* cited by examiner

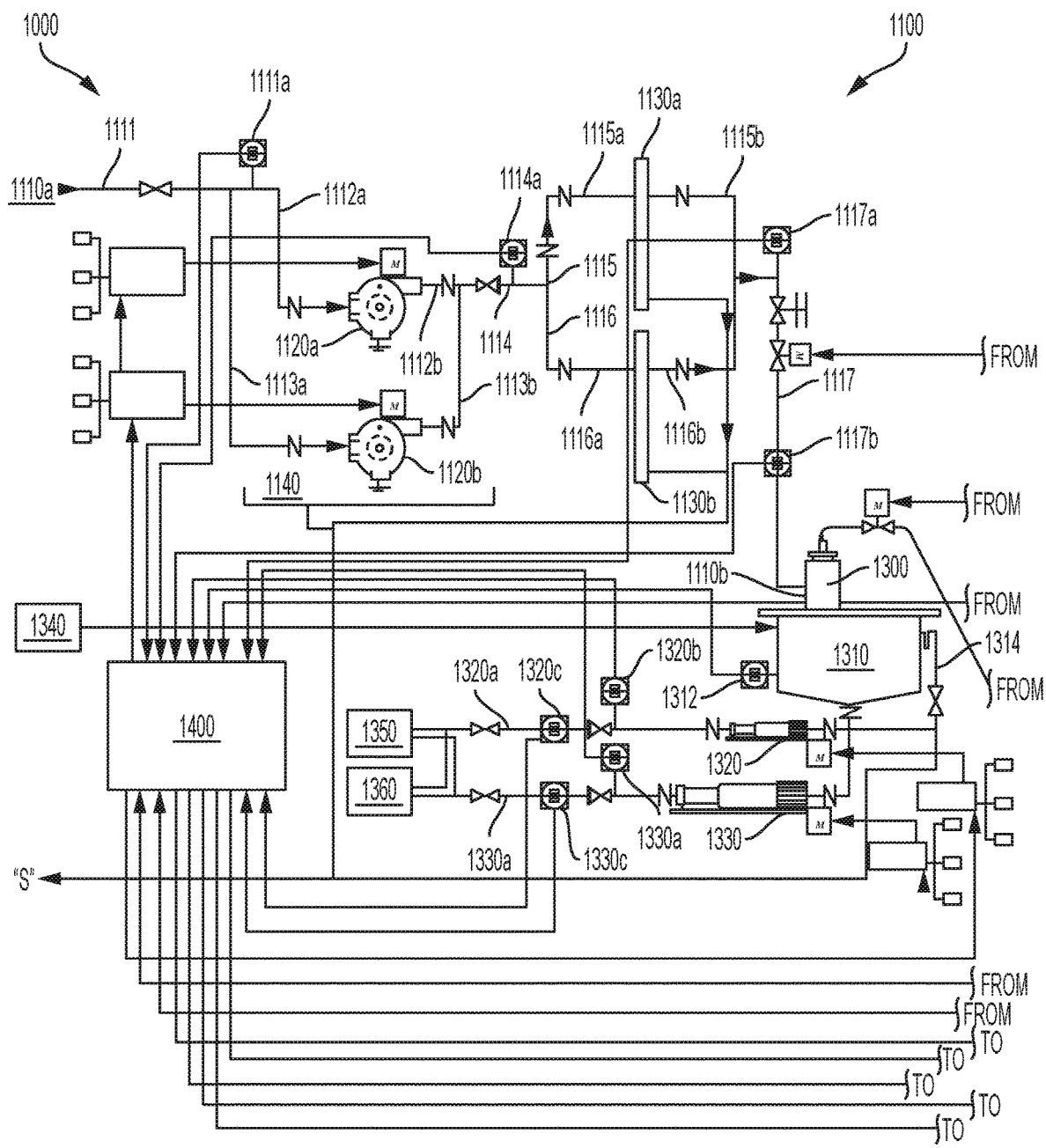

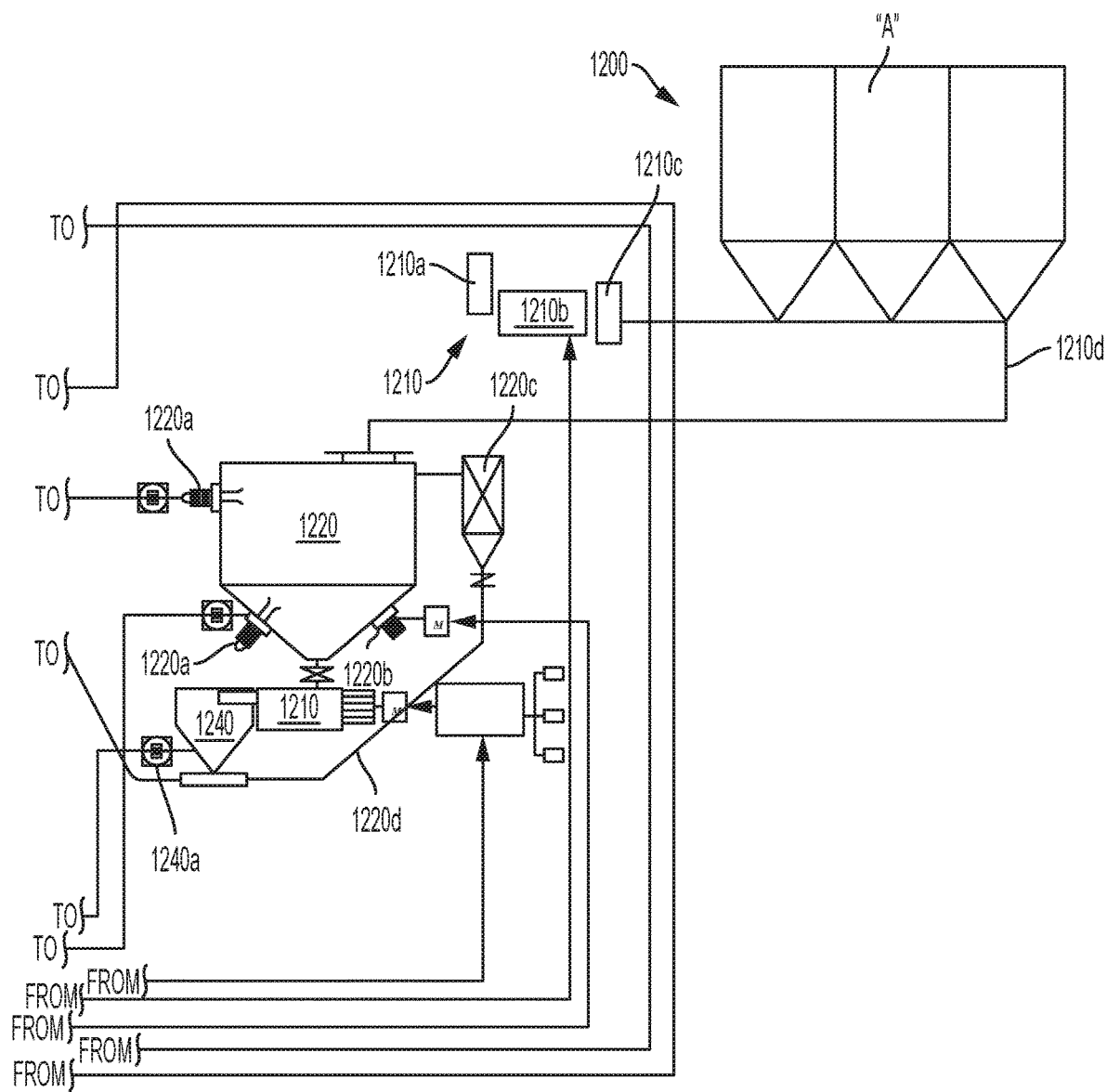

POLYMER DISPERSION SYSTEM FOR USE IN A HYDRAULIC FRACTURING OPERATION

TECHNICAL FIELD

The present disclosure relates to a polymer dispersion system for use in a hydraulic fracturing operation in the oil and gas industry.

BACKGROUND

Use of subterranean formation treatment fluids (e.g. polymer hydraulic fracturing fluids) is a common practice in a hydraulic fracturing operation in the oil and gas industry. Such fluids not only make it possible to reduce fracturing injection pressures, but also serve to reduce frictional forces in the injection pipes that may otherwise be present if other fracturing fluids or no fracturing fluids were used. The preparation of polymer hydraulic fracturing fluids, on demand and at the site of the hydraulic fracturing operation, and how such fracturing fluids are prepared are a continual point of interest to those active in the oil and gas industry.

The preparation of polymer hydraulic fracturing fluids can be done through apparatuses and systems commonly referring to as "polymer dissolution equipment". Examples of such pieces of equipment have been previously discussed in the patent literature (see for example, International application number PCT/EP2009/063961, International application number PCT/FR2011/050262, and U.S. Pat. registration No. 9,067,182). Such prior art pieces of equipment generally comprise a "polymer slicing unit", and such unit generally comprises a rotor driven by a motor, and blades for mixing and grinding the polymer into a solvent in order to form a polymer emulsion that is either the polymer hydraulic fracturing fluid or a component of the polymer hydraulic fracturing fluid. An example of a "polymer slicing unit" can be found in international application number PCT/EP2008/053495.

A polymer dissolution equipment comprising a polymer slicing unit suffers from potential drawbacks including wear and tear and breakdown of mechanical parts within the unit. Given that the preparation of polymer hydraulic fracturing fluids is a highly intensive and mechanic process, the polymer slicing unit is a component of a polymer dissolution equipment that requires frequent replacement. Such breakdown of equipment may lead to delays in hydraulic fracturing operations and may result in loss opportunity or revenue. In addition, the amount of polymer that can be liquefied into a solvent to form the fracturing fluid is also limited by the mechanical limitations of a polymer slicing unit.

To circumvent the potential foregoing issues with polymer dissolution equipment comprising a polymer slicing unit, some polymer dissolution equipment replace the polymer slicing unit with an eductor mixing device (e.g. U.S. Pat. No. 7,794,135). While it had been previously noted that eductor mixing devices suffer from some disadvantages such as large energy consumption, excessive noise, and energy inefficiencies (e.g. United States Pub. No. 2010/0220549), such perceived disadvantages have largely been or can largely be mitigated through advances to the eductor mixing devices themselves.

Regardless of the polymer dissolution equipment used within a polymer dispersion system, however, many existing polymer dispersion systems continue to suffer from long "down" periods when a component within the system malfunctions or when a portion of the system is taken "offline" for maintenance or repair. Disclosed herein is a polymer dispersion system that may mitigate operational losses associated with equipment "down" time or "offline" periods.

SUMMARY

As described in a part of the present disclosure, there is a polymer dispersion system comprising: (a) a first sub-system comprising an ingress and an egress; (b) a second sub-system comprising an ingress and an egress; (c) an eductor mixing device comprising (i) a first inlet in fluid communication with the egress of the first sub-system, (ii) a second inlet in fluid communication with the egress of the second sub-system, and (iii) an egress; (d) a tank assembly comprising an ingress and an egress, the ingress of the tank assembly being in fluid communication with the egress of the eductor mixing device; and (e) a transfer sub-system comprising an ingress that is coupled to the egress of the tank assembly.

The first sub-system is used for receiving a liquid medium and for directing the liquid medium towards the eductor mixing device, the second sub-system is used for receiving a particulate material and for directing the particulate material towards the eductor mixing device, the first inlet of the eductor mixing device is for receiving the liquid medium from the first sub-system, the second inlet of the eductor mixing device is for receiving the particulate material from the second sub-system, the eductor mixing device is capable of generating a negative pressure for drawing the liquid medium and the particulate material into the eductor mixing device, the eductor mixing device is used for mixing the liquid medium and the particulate material by vortex to form a mother solution, and the tank assembly is used for receiving the mother solution.

The first sub-system further comprises a line for transporting the liquid medium. The line comprises a plurality of segments including: (a) a first segment comprising an ingress which is also the ingress of the first sub-system, and an egress; (b) a second segment comprising an ingress and an egress, the ingress of the second segment being coupled to the egress of the first segment, the second segment comprising a first pump that is disposed between the ingress and egress of the second segment; and (c) a third segment comprising an ingress and an egress, the ingress of the third segment being coupled to the egress of the first segment, the third segment comprising a second pump that is disposed between the ingress and egress of the third segment.

The second sub-system comprises: (a) a containing unit for containing the particulate material, the containing unit comprising an egress; (b) a feeder unit comprising an ingress that is coupled to the egress of the silo assembly via a conduit; and (c) a conveying unit in fluid communication with an egress of the feeder unit, and for receiving the particulate material from the feeder unit, the conveying unit in fluid communication with the eductor mixing device.

The containing unit comprises: (a) a level meter for controlling the volume of the particulate material introduced through the egress of the containing unit and into the feeder unit; and (b) a vibrator for agitating the particulate material that is contained in the containing unit.

The conveying unit is in fluid communication with a dust collection unit, and the dust collective unit for receiving any particulate material that is not received into the feeder unit.

The eductor mixing device is in fluid communication with the conveying unit.

The interior surface of one or more parts of the second sub-system may be coated with a non-stick coating.

One or more parts of the second sub-system may be coupled to a heating device.

The tank assembly may further comprise an overflow pipe that is in fluid communication with an interior volume of the tank assembly, the overflow pipe for receiving excess mother solution that cannot be contained within the tank assembly.

The tank assembly comprises an egress that is coupled to the transfer sub-system by a conduit. The transfer sub-system further comprises a first transfer pump and a second transfer pump, both of which are coupled to an egress of the tank assembly.

The tank assembly further may further comprise a liquid level meter for regulating the volume of the mother solution flowing towards the first transfer pump, the second transfer pump, or both.

The first transfer pump may be a low pressure pump, and the second transfer pump may be a high pressure pump.

The operation of the polymer dispersion system is controlled by a programmable logic controller sub-system.

As described in another part of the disclosure, there is a method of operating a polymer dispersion system, the method comprising: (a) receiving a liquid medium in a first sub-system of the polymer dispersion system; (b) receiving a particulate material in a second sub-system of the polymer dispersion system; (c) introducing the liquid medium and the particulate material into an eductor mixing device that is in fluid communication with an egress of the first sub-system and an egress of the second sub-system; (d) mixing the liquid medium and the particulate material by vortex to form a mother solution; and (e) directing the mother solution to the first transfer pump, the second transfer pump, or both.

As described in another part of the disclosure, there is a system for use in a hydraulic fracturing operation, the system comprising: (a) a tank assembly comprising an ingress and an egress; (b) a first transfer pump in fluid communication with the egress of the tank assembly; and (c) a second transfer pump in fluid communication with the egress of the tank assembly; wherein the second transfer pump has a pump volume capacity that is greater than the first transfer pump; and wherein the second transfer pump is configured to operate at a higher pump pressure than the first transfer pump.

As described in another part of the disclosure, there is a system for use in a hydraulic fracturing operation, the system comprising: (a) a tank assembly comprising an ingress and an egress; (b) a first transfer pump in fluid communication with the egress of the tank assembly; and (c) a second transfer pump in fluid communication with the egress of the tank assembly; wherein the second transfer pump has a pump volume capacity that is greater than the first transfer pump; and wherein the second transfer pump is configured to operate at a higher pump pressure than the first transfer pump. The system further comprises: (d) a first sub-system comprising an ingress and an egress; (e) a second sub-system comprising an ingress and an egress; and (f) one or more eductor mixing device, each one or more eductor mixing device comprising (i) a first inlet in fluid communication with the egress of the first sub-system, (ii) a second inlet in fluid communication with the egress of the second sub-system, and (iii) an egress in fluid communication with the ingress of the tank assembly. The first sub-system is configured to receive liquid medium and to transport same towards the one or more eductor mixing device. The second sub-system is configured to receive particulate material and to transport same towards the one or more eductor mixing device. The first inlet of each one or more eductor mixing device is configured to receive liquid medium from the first sub-system. The second inlet of each one or more eductor mixing device is configured to receive particulate material from the second sub-system. Each one or more eductor mixing device is capable of generating a negative pressure for drawing liquid medium and particulate material into said eductor mixing device. Each one or more eductor mixing device is for mixing liquid medium and particulate material by vortex for forming mother solution.

This summary does not necessarily describe the entire scope of all aspects of the disclosure. Other aspects, features and advantages will be apparent to those of ordinary skill in the art upon review of the following description of specific embodiments.

BRIEF DESCRIPTION OF DRAWINGS

In the accompanying drawings, which illustrate one or more embodiments:

FIG. 1 is a schematic view of a polymer dispersion system (1000) comprising a water intake sub-system (1100), a dry materials intake sub-system (1200), mixing sub-system (1300) for mixing water and dry material to form a mother solution, a tank assembly (1310) that is downstream of the mixing sub-system (1300) and that is coupled to a solution buffer tank (1340), a plurality of pumps (1320, 1330) that are downstream of the mixing sub-system (1300) and tank assembly (1310) for use in injecting mother solution towards further downstream hydraulic fracturing operations, a missile unit (1350) and a blender unit (1360) downstream of the plurality of pumps (1320, 1330), and a programmable logic controller (1400) for controlling the various components of the polymer dispersion system (1000). The arrowed lines therein represent communication pathways between the programmable logic controller (1400) and the various components of the polymer dispersion system (1000). FIG. 1 further comprises a legend describing various valves and frequency converters that are disposed in a plurality of locations within the polymer dispersion system.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

As used herein, the term "about", when used to describe a recited value, means within 5% of the recited value.

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

As used herein, the term "low shear" refers to any applied force or stress within a range of forces and stresses than does not cause greater than 2% degradation of polymeric material in the "mother solution".

As used herein, the term "connected" may refer to any one of reversible coupling (e.g. nuts and bolts), irreversible coupling to (e.g. through welding), or two or more defined portions of an other integral object (e.g. the openings and extensions therefrom of an integral pipe elbow).

As used herein, the term "PLC" means programmable logic controller.

As used herein, the term "segment" in reference to water line 1100, refers to a portion of water line 1100. For example, water line 1100 may comprise of a plurality of discrete pipes each coupled to one another by means known in the art (e.g. reversible coupling like nuts and bolts or irreversible coupling like welding). Such pipes may described herein as a "segment".

As used herein, the term "substantially" is intended to contemplate any and all variations or deviations of an art, process, value, machine, manufacture or composition of matter that are not of material effect.

Described in the present disclosure is a polymer dispersion system for preparing a polymer hydraulic fracturing fluid. The polymer dispersion system comprises: (a) a first sub-system comprising an ingress and an egress; (b) a second sub-system comprising an ingress and an egress; (c) an eductor mixing device comprising (i) a first inlet in fluid communication with the egress of the first sub-system, (ii) a second inlet in fluid communication with the egress of the second sub-system, and (iii) an egress; (d) a tank assembly comprising an ingress and an egress, the ingress of the tank assembly being in fluid communication with the egress of the eductor mixing device; and (e) a transfer sub-system comprising an ingress that is coupled to the egress of the tank assembly. The liquid medium can be any suitable liquid medium or combination of suitable liquid media known in the art, such as water. An example of the first sub-system is a sub-system that is designed to receive a liquid medium, such as a water intake sub-system that is designed to direct water towards the eductor mixing device. An example of the second sub-system is a sub-system that is designed to receive a dry material (e.g. polymer in dry form). The eductor mixing device is used for mixing the liquid medium and the polymer in dry form together to form a polymer emulsion (also referred to as a "mother solution"). The tank assembly is for containing the formed polymer emulsion.

The system may further comprise a transfer sub-system that can be in fluid communication with the tank assembly. The transfer sub-system may be adapted to transfer a polymer emulsion to a blender unit, a missile unit, or both. The blender unit may mix the mother solution with a second material (e.g. sand) to form a polymer hydraulic fracturing fluid. The missile unit delivers the polymer hydraulic fracturing fluid downhole for use in a hydraulic fracturing operation. In other versions of the system, the mother solution is the polymer hydraulic fracturing fluid (i.e. the mother solution does not undergo further mixing), and the mother solution is delivered directly to the missile unit and not further blended in the blender unit. The system is controlled and operated via a programmable logic controller. The system is also connected, or can be connected, to a sewage outlet (e.g. sewage outlet "S" as depicted in FIG. 1) or other external holding tank. The system may be portable and mobile, and may be brought onto the site of the hydraulic fracturing operation.

Polymer Dispersion System

According to an embodiment of the system, and referring to FIG. 1, there is a system 1000 comprising a water intake sub-system 1100, a polymer intake sub-system 1200, and an eductor mixing device 1300. System 1000 further comprises a plurality of valves disposed at various suitable locations within system 1000, the plurality of valves for regulating the flow of materials (e.g. water, polymer, polymer emulsion) through system 1000. Examples of suitable valves include throttle valves 1101, safety valves 1102, ball valves 1103, electric valve 1104, disc valves 1105, shut-off valves 1106, check valves 1107, and any combination thereof. The location of the plurality of valves, according to this embodiment, is depicted in FIG. 1. In other embodiments, the valves may be disposed within the system at other suitable locations. PLC 1400 is adapted to control various aspects and components of system 1000 for ensuring operation of system 1000.

Water Intake Sub-System

Water intake sub-system 1100 is a first sub-system of system 1000. Sub-system 1100 comprises a water line 1110 for receiving water into sub-system 1100 and for transporting water through sub-system 1100 and towards eductor mixing device 1300. Water line 1110 comprises an inlet 1110a for receiving water, and an outlet 1110b directed toward and in fluid communication with an ingress of eductor mixing device 1300. Water line 1110 is made up of a plurality of water line segments coupled together. First water line segment 1111 comprises an ingress that is also inlet 1110a and an egress that is in fluid communication with (i) an ingress of second water line segment 1112, and (ii) an ingress of third water line segment 1113. First water line segment 1111 is for directing water towards second water line segment 1112 and third water line segment 1113. First water line segment 1111 is placed in series with second water line segment 1112 and third water line segment 1113. Second water line segment 1112 is placed in parallel with third water line segment 1113.

As contemplated in this embodiment, first water line segment 1111 comprises a pressure meter 1111a for measuring water pressure within first water line segment 1111. Pressure meter 1111a is in communication with PLC 1400, and sends collected data related to the water pressure in first water line segment 1111 in real-time to PLC 1400. In other embodiments, the first water line segment may not comprise a pressure meter.

Second water line segment 1112 is connected to a first water supply pump 1120a. First water supply pump 1120a serves the purpose of pumping water present in water line 1110 through sub-system 1100 and towards eductor mixing device 1300. The water supply pump can be any water supply pump that is known in the art and fit for an application for producing polymer hydraulic fracturing fluids. As contemplated in this embodiment, first water supply pump 1120a has a volume of over 300 litres and is capable of processing 50 cubic metres of water per hour. Second water line segment 1112, itself, can be divided into two parts: (i) a first part 1112a that leads towards first water supply pump 1120a, and (ii) a second part 1112b that leads away from first water supply pump 1120a.

Third water line segment 1113 is connected to a second water supply pump 1120b. Second water supply pump 1120b serves the purpose of pumping water present in water line 1110 through sub-system 1100 and towards eductor mixing device 1300 in the event that first water supply pump 1120a becomes inoperative. The water supply pump can be any water supply pump that is known in the art and fit for purpose for producing polymer hydraulic fracturing fluids. As contemplated in this embodiment, second water supply pump 1120b has a volume of over 300 litres and is capable of processing 50 cubic metres of water per hour. Third water line segment 1113, itself, can be divided into two parts: (i) a first part 1113a that leads towards second water supply pump 1120b, and (ii) a second part 1113b that leads away from second water supply pump 1120b.

As contemplated in this embodiment, third water line segment 1113 and second water supply pump 1120b serve as a "back-up" for second water line segment 1112 and first water supply pump 1120a, in the event that second water line segment 1112 and first water supply pump 1120a become inoperative or are taken "offline" (e.g. for repair, maintenance, or other reasons). In practice, when first water supply pump 1120a becomes inoperative or is taken "offline", PLC 1400 directs a signal to close the valve (depicted as a disc valve 1105 in FIG. 1) disposed upstream of the ingress of first water supply pump 1120a in part 1112a and another signal to open the valve (depicted as a disc valve 1105 in FIG. 1) disposed upstream of the ingress of second water supply pump 1120b in part 1113a, thereby preventing water in water line 1110 from further accessing first water supply pump 1120a and diverting water in water line 1110 to first part 1113a and towards second water supply pump 1120b. Conversely, when first water supply pump 1120a is ready to become "online" again, PLC 1400 directs a signal to close the valve (depicted as a disc valve 1105 in FIG. 1) disposed upstream of the ingress of second water supply pump 1120b in part 1113a and another signal to open the valve (depicted as a disc valve 1105 in FIG. 1) disposed upstream of the ingress of first water supply pump 1120a in part 1112a, thereby preventing water in water line 1110 from further accessing second water supply pump 1120b and diverting water in water line 1110 to first part 1112a and towards first part water supply pump 1120a. In some embodiments, such as the embodiment depicted in FIG. 1, valves (such as disc valves 1105) are disposed downstream of the egresses of first water supply pump 1120a in part 1112b and second water supply pump 1120b in part 1113b for the purposes of further limiting any flow of water through: (i) water line segment 1112 when pump 1120a is "offline"; and (ii) water line segment 1113 when pump 1120b is "offline".

The combination of second water line segment 1112 and third water line segment 1113 also provides a "split flow" function whereby water is directed to both water line segments 1112 and 1113 and towards both supply pumps 1120a and 1120b. The "split flow" arrangement advantageously minimizes the likelihood that any one of supply pumps 1120a and 1120b will be overworked or overused while system 1000 is in operation.

As contemplated in this embodiment, first water supply pump 1120a and second water supply pump 1120b are each connected to a waste tank 1140 that is used for collecting excess water that may be drained from pumps 1120a and 1120b. Waste tank 1140 is connected to a waste line (not numbered) that leads to sewage outlet "S" or an external holding tank (not shown).

Second part 1112b of second water line segment 1112 and second part 1113b of third water line segment 1113 are both connected to and in fluid communication fourth water line segment 1114, which is a segment of water line 1110. Fourth water line segment 1114 comprises (0 an ingress that is in fluid communication with both second part 1112b of second water line segment 1112 and second part 1113b of third water line segment 1113, and (ii) an egress. As contemplated in this embodiment, fourth water line segment 1114 comprises a pressure meter 1114a for measuring water pressure within fourth water line segment 1114. Pressure meter 1114a is in communication with PLC 1400, and sends collected data in real-time to PLC 1400. If the data collected from pressure meter 1114a is above or below In other embodiments, the fourth water line segment may not comprise a pressure meter.

The egress of fourth water line segment 1114 is in fluid communication with (i) an ingress of fifth water line segment 1115, and (ii) an ingress of sixth water line segment 1116. Fourth water line segment 1114 is for directing water towards fifth water line segment 1115 and sixth water line segment 1116.

Fifth water line segment 1115 can be divided into two parts: (i) a first part 1115a, and (ii) a second part 1115b. The two parts of fifth water line segment 1115 are separated by a filter 1130a. Filter 1130a functions to remove particles from water that may adversely impact the preparation of a fracturing fluid. Filter 1130a can be any suitable filter known in the art. A non-limiting example of a suitable filter is a hydraulic filter. The pore size of filter 1130a can be any suitable size, provided that it fulfils its function of removing particles from water that may adversely impact the preparation of a fracturing fluid. For example, the pore size of filter 1130a can be between about 1 microns and about 1000 microns. For example, suitable pore sizes include, but are not limited to, about 1 µm, about 10 µm, about 100 µm, about 200 µm, about 300 µm, about 400 µm, about 500 µm, about 600 µm, about 700 µm, about 800 µm, about 900 µm, about 1000 µm. As contemplated in this embodiment, filter 1130a has a pore size of about 200 µm.

Sixth water line segment 1116 can be divided into two parts: (i) a first part 1116a, and (ii) a second part 1116b. The two parts of sixth water line segment 1116 are separated by a filter 1130b. Filter 1130b functions to remove particles from water that may adversely impact the preparation of a fracturing fluid. Filter 1130b can be any suitable filter known in the art. A non-limiting example of a suitable filter is a hydraulic filter. The pore size of filter 1130b can be any suitable size, provided that it fulfils its function of removing particles from water that may adversely impact the preparation of a fracturing fluid. For example, the pore size of filter 1130b can be between about 1 microns and about 1000 microns. For example, suitable pore sizes include, but are not limited to, about 1 µm, about 10 µm, about 100 µm, about 200 µm, about 300 µm, about 400 µm, about 500 µm, about 600 µm, about 700 µm, about 800 µm, about 900 µm, about 1000 µm.

As contemplated in this embodiment, water line segment 1116 and filter 1130b serve as a "back-up" for water line segment 1115 and filter 1130a, in the event that water line segment 1115 and filter 1130a become inoperative or are taken "offline" (e.g. for repair, maintenance, or other reasons). In practice, when filter 1130a becomes inoperative or is taken "offline", PLC 1400 directs a signal to close the valve (depicted as a disc valve 1105 in FIG. 1) disposed upstream of the ingress of filter 1130a in part 1115a and another signal to open the valve (depicted as a disc valve 1105 in FIG. 1) disposed upstream of the ingress of filter 1130a in part 1116a, thereby preventing water in water line 1110 from further accessing filter 1130a and diverting water in water line 1110 to part 1116a and towards filter 1130b.

Conversely, when filter 1130a is ready to become "online" again, PLC 1400 directs a signal to close the valve (depicted as a disc valve 1105 in FIG. 1) disposed upstream of the ingress of filter 1130b in part 1116a and another signal to open the valve (depicted as a disc valve 1105 in FIG. 1) disposed upstream of the ingress of filter 1130a in part 1115a, thereby preventing water in water line 1110 from further accessing filter 1130b and diverting water in water line 1110 to part 1115a and towards filter 1130a. In some embodiments, such as the embodiment depicted in FIG. 1, valves (such as disc valves 1105) are disposed downstream of the egresses of filter 1130a and filter 1130b for the purposes of further limiting any flow of water through: (i) water line segment 1115 when filter 1130a is "offline"; and (ii) water line segment 1116 when filter 1130b is "offline". As contemplated in this embodiment, filter 1130a and filter 1130b are each connected to a waste line (not numbered) that leads to sewage outlet "S" or an external holding tank (not shown).

The combination of the water line segments 1115 and 1116 also provides a "split flow" function whereby water is directed to both water line segments 1115 and 1116 and towards both filters 1130a and 1130b. The "split flow" arrangement advantageously minimizes the likelihood that any one of filters 1130a and 1130b will be overworked or overused while system 1000 is in operation.

Second part 1115b of fifth water line segment 1115 and second part 1116b of sixth water line segment 1116 are both connected to and in fluid communication with seventh water line segment 1117, which is a segment of water line 1110. Seventh water line segment 1117 comprises (i) an ingress that is in fluid communication with both second part 1115b of fifth water line segment 1115 and second part 1116b of sixth water line segment 1116, and (ii) an egress. The egress of seventh water line segment 1117 (i.e. outlet 1110b) is directed toward and in fluid communication with an ingress of eductor mixing device 1300. Seventh water line segment 1117 is for directing water towards eductor mixing device 1300. As contemplated in this embodiment, seventh water line segment 1117 comprises one or more pressure monitors 1117a, and one or more flow meters 1117b. The one or more pressure monitors 1117a, and one or more flow meters 1117b are in constant communication with PLC 1400. Should the pressure monitor readings or the flow meter readings deviate from the reference values at the PLC 1400, PLC 1400 shall adjust any and all parameters of first sub-system 1100 including, but not limited to, water intake rate at the ingress of water line 1110 and the opening or closing of valves disposed along water line 1110, so that the appropriate pressure and flow rate of water exiting egress 1110b and into eductor mixing device 1300 are met.

Disposed within first sub-system 1100 are a plurality of valves, each of which is communicative with PLC 1400 and receives instructions from PLC 1400 as to, for example, whether such valves should be open, closed, or partially open (and if so to what degree). As depicted in FIG. 1: (i) a ball valve 1103 is disposed along first water line segment 1111; (ii) disc valves 1105 are disposed along the first and second parts of second water line segment 1112, the first and second parts of third water line segment 1113, the first and second parts of fifth water line segment 1115, and the first and second parts of sixth water line segment 1116; (iii) a check valve 1107 is disposed along fourth water line segment 1114; and (iv) a throttle valve 1101 and an electric valve 1104 are disposed in series along seventh water line segment 1117. In other embodiments, valves may be arranged in different sequences and orders.

Motors (as depicted in FIG. 1 as the symbol ) are also connected to first water supply pump 1120a and second water supply pump 1120b, for regulating the operation of the water supply pumps, as required; motors are communicative with and controlled by PLC 1400. In other embodiments, different combinations of valves may be disposed at different locations along water line 1110 in first sub-system 1100. Disposed within first sub-system 1100 are a plurality of flowmeters and pressure indicators for monitoring flow of water through first sub-system 1100 and pressure experienced within first sub-system 1100 during operation. Each flowmeter and pressure indicator is communicative with PLC 1400. In other embodiments, there may not be flowmeters and pressure indicators in the first sub-system. Disposed within first sub-system 1100 are a plurality of frequency converters 1108, each equipped with a "start and stop" function 1108a, a "run" function" 1108b, and a "speed regulation" function 1108c, and each being communicative with PLC 1400 and for relaying signals and commands to the various components within the system 1000 and for regulating specific functions thereof. In other embodiments, additional frequency converters may be disposed at other suitable locations within the first sub-system.

The water intake sub-system may be similar in function to a water inlet circuit as known in the art such as but not limited to PCT/EP2009/063961.

Polymer Intake Sub-System

As contemplated in this embodiment, polymer intake sub-system 1200 is the second sub-system of system 1000. Sub-system 1200 comprises: (i) a first conveying unit 1210; (ii) a containing unit 1220; (iii) a feeder unit 1230; and (iv) a second conveying unit 1240.

First conveying unit 1210 is used for conveying a dry material (e.g. dry polymer powder) from a dry material source (e.g. bulk tankers "A") to containing unit 1220. As contemplated in this embodiment, first conveying unit 1210 is a pneumatic conveying unit that comprises an air filter 1210a, a feed fan 1210b, and an air dryer 1210c. In other embodiments, the first conveying unit does not comprise an air dryer. In other embodiments, the first conveying unit 1210 can be another unit that is known in the art. Non-limiting examples of such units include air blowing units, pneumatic transferring units, and auger units. First conveying unit 1210 and containing unit 1220 are coupled to each other by conduit 1210d. Bulk tankers "A" are for directing dry material into conduit 1210d, and first conveying unit 1210 is for inducing movement of the dry material through conduit 1210d and towards conveying unit 1220. The interior surface of conduit 1210d (as well as other conduits connecting different components of second sub-system 1200 together) is coated with a coating that lessens the likelihood of "clumping" of dry material within the conduit. Non-limiting examples of suitable coatings include "non-stick" coatings. Non-limiting examples of "non-stick" coatings include fluorinated coatings and perfluorinated coatings (e.g. Teflon™). As contemplated in this embodiment, the temperature of the conduits connecting different components of second sub-system 1200 together is also regulated by a heating unit (not shown) that is controlled by PLC 1400. The temperature of the conduits can be regulated at a temperature where the likelihood of "clumping" of dry material within the conduits is lessened. In other embodiments, the second sub-system does not comprise a heating unit.

Containing unit 1220 is used for storing a dry material (e.g. dry polymer powder) which has been delivered to containing unit 1220 via conduit 1210d. Containing unit 1220 further comprises one or more level gauges 1220a for monitoring and checking the amount of material delivered through containing unit 1220 and one or more vibrator 1220b for improving consistency of material delivered through container 1220. As contemplated in this embodiment, containing unit 1220 is model WD-GF-1800 and has a capacity of greater than 300 litres. As contemplated in this embodiment, level gauges 1220a is a USA Standard level meter. As contemplated in this embodiment, vibrator 1220b is a USA Standard vibrator. In other embodiments, the containing unit, the level gauge, and the vibrator may be another suitable level gauge and vibrator known in the art. In other embodiments, the containing unit does not comprise a level gauge.

Coupled to containing unit 1220 is a dust extraction unit 1220c. A dust extraction unit is used for collecting dry material dust that is unable to settle in containing unit 1220 and for directing at least a portion of such dust back into second sub-system 1200 at second conveying unit 1240. The feature advantageously improves the direction of dry material to towards the Unit 1220c can be coupled to second conveying unit 1240 by conduit 1220d. One or more suitable valves (e.g. disc valve) can be disposed within conduit 1220d for regulating the flow and amount of dry material dust back into second sub-system 1200. In other embodiments, the dust extraction unit can be any suitable dust extraction unit known in the art. In other embodiments, sub-system 1200 does not comprise a dust extraction unit.

Containing unit 1220 comprises an egress that is connected to an ingress of feeder unit 1230 by way of a conduit (not numbered), disposed within which is a valve (as depicted in FIG. 1). Depending on whether the valve is in its "open" state or its "closed" state, the egress of containing unit 1220 can be in fluid communication with the ingress of feeder unit 1230. Feeder unit 1230 is used for regulating the amount of dry material that is directed toward second conveying unit 1240. As contemplated in this embodiment, feeder unit 1230 is a screw feeder. In other embodiments, the feeder unit can be any suitable feeder unit that is known in the art.

The speed at which screw feeder 1230 operates is controlled by PLC 1400. Namely, PLC 1400 provides instructions to frequency converter 1108 that is coupled to a motor that drives feeder unit 1230, the frequency converter 1108 regulating the function of the motor connected to feeder unit 1230. Feeder unit 1230 further comprises an egress through which dry material is extruded. The egress of feeder unit 1230 is in fluid communication with a hopper, which in turn is in fluid communication with second conveying unit 1240. In other embodiments, the egress of feeder unit 1230 is in direct and fluid communication with second conveying unit 1240.

Second conveying unit 1240 is used for directing dry material toward eductor mixing device 1300. As contemplated in this embodiment, second conveying unit 1240 is a pneumatic conveying unit, such as one known in the art. In other embodiments, second conveying unit 1240 can be any suitable conveying unit that is known in the art. Second conveying unit 1240 also comprises a level gauge 1240a for use in regulating dry material flow consistency.

Disposed within second sub-system 1200 are a plurality of valves that are each communicative with PLC 1400. As depicted in FIG. 1: (i) a ball valve 1103 is disposed in the conduit that couples containing unit 1220 to feeder unit 1230; and (ii) a disc valve 1105 that is disposed in conduit 1220d. In other embodiments, different combinations of valves may be disposed at different locations within second sub-system 1200. Disposed within second sub-system 1200 are a plurality of level gauges for regulating dry material flow consistency, each of which is communicative with PLC 1400. Disposed within second sub-system 1200 is a frequency converter 1108 that is equipped with a "start and stop" function 1108a, a "run" function 1108b, and a "speed regulation" function 1108c, and that is communicative with PLC 1400 and for relaying signals and commands to various components within system 1000 and for regulating the functions thereof. In other embodiments, additional frequency converters may be disposed at other suitable locations within the second sub-system.

The polymer intake sub-system may be similar to a materials transfer sub-system as known in the art such as but not limited to PCT/EP2009/063961.

Eductor Mixing Device

Eductor mixing device 1300 comprises two ingress locations: (i) one in fluid communication with the egress of second conveying unit 1240; and (ii) one in fluid communication with water line egress 1110b. Eductor mixing device 1300 can be any suitable eductor mixing device described in the art. Examples of eductor mixing devices include, but are not limited to, those described in U.S. Pat. No. 4,186,772 to Handleman et al., U.S. Pat. No. 4,884,925 to Kemp et al., and U.S. Pub. No. 2005/0111298 to Lott.

Eductor mixing device 1300 provides a means for mixing a fluid (e.g. water) and a solid material (e.g. polymer powder) together in a vortex to create a mother solution. Advantageously, eductor mixing device 1300 lacks the plurality of mechanical components that polymer slicing units typically have, thereby decreasing the likelihood of mechanical failure of mechanical parts over time due to wear and tear. Advantageously, eductor mixing device 1300 can produce mother solutions with a high concentration (up to about 5%) of polymer content than could otherwise be produced by using a polymer slicing unit, and can process high volumes of dry polymer. Advantageously, eductor mixing devices generally occupy a smaller area and volume than polymer slicing units, and are therefore amenable to mobile polymer dispersion systems with high processing capacities. As contemplated in this embodiment, eductor mixing device 1300 has capacity to produce about 100 m³ per hour of mother solution with a polymer concentration of up to about 5%.

As contemplated in this embodiment; a second eductor mixing device (not shown or numbered) is provided and serve as a "back-up" to eductor mixing device 1300 in the event that eductor mixing device 1300 is taken offline; for example for repair, maintenance, or trouble-shooting. Eductor mixing device 1300 is reversibly coupled to sub-systems 1100 and 1200 via camlock fitting; thereby permitting ease of replacing said eductor mixing device with a "back-up" eductor mixing device. In practice, and if eductor mixing device 1300 requires to be exchanged, the flow of water from sub-system 1100 to eductor mixing device 1300 and the flow of dry material from sub-system 1200 to eductor mixing device 1300 are stopped (as regulated by PLC 1400 in a manner known in the art). Solution buffer tanks 1343 which hold an excess of "mother solution" (as such term is used in this specification) is coupled to tank assembly 1310 and such excess "mother solution" is delivered into tank assembly 1310 to ensure constant delivery of "mother solution" downstream to units 1320/1330 while eductor mixing device 1300 is replaced. Once the "back-up" eductor mixing device is installed and cam-locked into coupling with sub-systems 1100 and 1200: flow of "mother solution" from solution buffer tanks 1340 into tank assembly 1310 is stopped by control via PLC 1400, and the flow of water from sub-system 1100 to the eductor mixing device and the flow of dry material from sub-system 1200 to the eductor mixing device is initiated.

As contemplated in another embodiment, a second eductor mixing device (not shown or numbered) is provided and serve as a "back-up" to eductor mixing device 1300 in the event that eductor mixing device 1300 is taken offline, for example for repair, maintenance, or trouble-shooting. Although not shown, it is contemplated that egress 1110*b* has a plurality of sub-outlets: one directed to and coupled with eductor mixing device 1300 and one directed to and coupled with the second eductor mixing device (not shown or numbered). Water flow from egress 1110*b* is directed to either one or both of the eductor mixing devices by the opening and closing of valves as controlled by PLC 1400 by methods known in the art. Although not shown, it is also contemplates that the egress of second conveying unit 1240 has a plurality of sub-outlets: one directed to and coupled with eductor mixing device 1300 and one directed to and coupled with the second eductor mixing device (not shown or numbered). Dry material exiting second conveying unit 1240 is directed to either one or both of the eductor mixing devices by the opening and closing of valves as controlled by PLC 1400 by methods known in the art.

Eductor mixing device 1300 has an egress that is in fluid communication with a tank assembly 1310. The tank assembly 1310 is used for containing a mother solution. Tank assembly 1310 comprises a plurality of accessories such as a liquid level meter 1312 for monitoring a level of polymer suspension contained in tank assembly 1310, and an overflow pipe 1314 for removing excess mother solution from tank assembly 1310. As contemplated in this embodiment, tank assembly 1310 has a volume of greater than 300 litres. In other embodiments, the tank assembly may be any suitable tank assembly known in the art.

Tank assembly 1310 is coupled to a transfer sub-system by a conduit (not numbered), the transfer sub-system comprising first transfer pump 1320 and a second transfer pump 1330. The conduit comprises a first portion that is directed and coupled to first pump 1320, and a second portion that is directed and coupled to a second pump 1330. A plurality of valves is disposed in the conduit, with at least one valve being disposed in the first portion and at least one valve being disposed in the second portion. The valves are for use in controlling (including preventing) flow of material (e.g. mother solution) into first transfer pump 1320 and second transfer pump 1330.

As contemplated in this embodiment, first transfer pump 1320 is a low shear screw pump with a pump volume capacity to pump 10 m$^3$ of mother solution per hour and an operable pressure setting between 0 to 150 PSI. For example, first transfer pump 1320 is operable between about 10 and about 140 PSI, about 10 and about 120 PSI, about 10 and about 100 PSI, about 10 and about 80 PSI, about 10 and about 60 PSI, about 10 and about 40 PSI, about 10 and about 30 PSI, about 10 and about 20 PSI, 0 and about 60 PSI, 0 and about 50 PSI, 0 and about 40 PSI, 0 and about 30 PSI, 0 and about 20 PSI, 0 and about 15 PSI, and 0 and about 10 PSI. As contemplated in this embodiment, second transfer pump 1330 is a low shear screw pump with a pump volume capacity to pump 40 m$^3$ of mother solution per hour and an operable pressure setting between 0 to 150 PSI. For example, second transfer pump 1330 is operable between about 30 and about 150 PSI, about 50 and about 150 PSI, about 70 and about 150 PSI, about 90 and about 150 PSI, about 100 and about 150 PSI, about 110 and about 150 PSI, about 120 and about 150 PSI, about 130 and about 150 PSI, and 140 and about 150 PSI. For example, first transfer pump 1320 may operate at a pressure of between about 0 and about 50 PSI and second transfer pump 1330 may operate at a pressure of between 70 and about 150 PSI. For example, first transfer pump 1320 may operate at a pressure of between about 0 and about 30 PSI and second transfer pump 1330 may operate at a pressure of between 90 and about 150 PSI. For example, first transfer pump 1320 may operate at a pressure of between about 0 and about 50 PSI and second transfer pump 1330 may operate at a pressure of between 110 and about 150 PSI.

By utilizing pumps with different pump capacities, system 1000 can be adapted to direct "mother solution" either directly to a downstream missile unit 1350 (which is adapted for use in downhole fracking operations); a downstream blender unit 1360, or both, and therefore split-flow operations. As contemplated in this embodiment, the valves disposed in the conduit are disc valves. In other embodiments, the valves can be any suitable valves known in the art. In other embodiments, the first transfer pump can be any suitable low shear, low pressure pump known in the art. In other embodiments, the second transfer pump can be any suitable low shear pump known in the art.

First transfer pump 1320 and second transfer pump 1330 can be operational one at a time. In such a set up, and as an improvement to a single pump design where the entire system would have to be put "offline" if repairs or maintenance to such single pump is required, first transfer pump 1320 and second transfer pump 1330 can serve as "back-ups" to one another, in the event that one of them becomes inoperable or is taken "offline" (e.g. for maintenance, repair, or other reasons).

As contemplated in this embodiment; however, first transfer pump 1320 and second transfer pump 1330 are operated at the same time. The egress of first transfer pump 1320 is coupled to conduit 1320*a*. Conduit 1320*a* is also coupled to a downstream unit such as a blender unit 1360, a missile unit 1350, or both. Conduit 1320*a* comprises one or more pressure monitors 1320*b* for measuring the fluid pressure of mother solution exiting first transfer pump 1320, a plurality of valves, and one or more flowmeters 1320*c* for measuring the flow rate of mother solution through conduit 1320*a*. As contemplated in this embodiment, flowmeter 1320*c* is an electromagnetic flowmeter. In other embodiments, the flowmeter can be any suitable flowmeter in the art. The egress of second transfer pump 1330 is coupled to conduit 1330*a*. Conduit 1330*a* is also coupled to a downstream unit such as a blender unit 1360, a missile unit 1350, or both. Conduit 1330*a* comprises one or more pressure monitors 1330*b* for measuring the fluid pressure of mother solution exiting second transfer pump 1330, a plurality of valves, and one or more flowmeters 1330*c* for measuring the flowrate of mother solution through conduit 1330*a*. As contemplated in this embodiment; flowmeter 1330*c* is an electromagnetic flowmeter. In other embodiments, the flowmeter can be any suitable flowmeter in the art.

Operating first transfer pump 1320 and second transfer pump 1330 at the same time permits the simultaneous production of two media, both of which may be used in downhole fracturing operations: (i) a solution that is predominantly the "mother solution" which may be directly delivered to the missile unit as a polymer hydraulic fracturing fluid downhole for use in a hydraulic fracturing operation; and (ii) a mixture that is created in the blender unit and that comprises "mother solution" and other components like sand, said mixture forming a polymer hydraulic fracturing fluid downhole for use in a hydraulic fracturing operation. By splitting the flow of "mother solution" between first transfer pump 1320 and second transfer pump 1330, where the majority of the "mother solution" flowing from the tank assembly 1310 is directed to second transfer pump 1330, an operator of system 1000 is able to introduce "mother solution" through first transfer pump 1320 into the blender unit 1360 at a manner that minimizes the evolution of air bubbles as "mother solution" is mixed with sand in the blender unit 1360. Without a split-flow system, a build up of air bubbles could potentially occur during the mixing of the "mother solution" and sand in the blender unit 1360. Entrained air bubbles in the mixture would lead to potential engine cavitation and potential premature failure of downhole fracturing equipment. The mixture in the blender unit 1360 forming the polymer hydraulic fracturing fluid can then be directed to the missile unit 1350 for use in a hydraulicfracturing operation. In other versions of the system, the mother solution is the polymer hydraulic fracturing fluid (i.e. the mother solution does not undergo further mixing), and the mother solution is delivered directly to the missile unit 1350 and not further blended in the blender unit 1360.

System 1000 is operated by programmable logic controller 1400. Programmable logic controller 1400 can be any PLC known in the art. The purpose of programmable logic controller 1400 is also known in the art, and comprises controlling and monitoring the function and performance of system 1000 as well as diagnosing and trouble-shooting potential operational issues of system 1000. As contemplated in this embodiment, PLC 1400 is comprises control configuration software, network communication software (e.g. EASYACCESS™), development and operation software, and at least two levels of control: (i) manual control and operation of system 1000; and (ii) local monitoring of the various components within system 1000 and automatic operation thereof.

Operation of System 1000

PLC 1400 is responsible for controlling and monitoring the function and performance of system 1000 and component parts (e.g. valves, pumps, mixing devices, filters, meters) thereof as well as diagnosing and trouble-shooting potential operational issues of system 1000. As depicted in FIG. 1 via stippled lines, PLC 1400 is adapted to be communicative with each of the various components of system 1000 for at least the purposes of monitoring the flow and volume of materials moved through system 1000, controlling the manufacturing of a mother solution, and managing the operation of system 1000. For example, PLC 1400 is communicative with frequency converters 1108 for the purposes of controlling the "start and stop" functions 1108*a*, "run" functions 1108*b*, and "speed regulation" functions 1108*c* of various components in system 1000. PLC 1400 monitors, automates, trouble-shoots, and controls system 1000 in a manner that would be understood in the art. PLC 1400 has a manual override function to allow an operator to manually manipulate the parameters of PLC 1400, if necessary (e.g. during an emergency situation).

As contemplated in this embodiment, water (and in other embodiments, more generally, a solvent) is introduced into inlet 1110*a* and flows through first water line segment 1111. The valves (e.g. disc valves) disposed in second water line segment 1112 are in an "open" state, thereby permitting the passage of the water from first water line segment 1111 through second water line segment 1112 and into first water supply pump 1120*a* and towards fourth water line segment 1114. The valves (e.g. disc valves) disposed in third water line segment 1113 are in an "closed" state, thereby preventing the passage of the water through third water line segment 1113 and into second water supply pump 1120*b* and towards fourth water line segment 1114.

In the event that first water supply pump 1120*a* needs to be taken "offline" for repairs, maintenance, or other reason, or in the event that second water line segment 1112 needs to be taken "offline" for repairs, maintenance, or other reason, PLC 1400 provides a signal to the valves disposed in second water line segment 1112 to switch to a "closed" state, thereby preventing the passage of the water through second water line segment 1112 and into first water supply pump 1120*a*. PLC 1400 provides a signal to the valves disposed in third water line segment 1113 to switch to an "open" state, thereby permitting the passage of the water through third water line segment 1113 and into second water supply pump 1120*b* and towards fourth water line segment 1114. When second water line segment 1112 is ready to come back "online", then PLC 1400 provides a signal to the valves disposed in third water line segment 1113 to switch to a "closed" state, and PLC 1400 provides another signal to the valves disposed in second water line segment 1112 to switch to an "open" state.

As contemplated in this embodiment, at any given time only one of second water line segment 1112 and third water line segment 1113 permits the passage of water from first water line segment 1111 to fourth water line segment 1114. In other embodiments, this may not be the case.

Water from second water line segment 1112 or third water line segment 1113, or both second water line segment 1112 and third water line segment 1113, flows into and through fourth water line segment 1114.

The valves (e.g. disc valves) disposed in fifth water line segment 1115 are in an "open" state, thereby permitting the passage of the water from fourth water line segment 1114 through fifth water line segment 1115, through filter 1130*a*, and towards seventh water line segment 1117. The valves (e.g. disc valves) disposed in sixth water line segment 1116 are in an "closed" state, thereby preventing the passage of the water through sixth water line segment 1116, through filter 1130*b*, and towards seventh water line segment 1117.

In the event that filter 1130*a* needs to be taken "offline" for repairs, maintenance, or other reason, or in the event that fifth water line segment 1115 needs to be taken "offline" for repairs, maintenance, or other reason, PLC 1400 provides a signal to the valves disposed in fifth water line segment 1115 to switch to a "closed" state, thereby preventing the passage of the water through fifth water line segment 1115 and into filter 1130*a*. PLC 1400 provides a signal to the valves disposed in sixth water line segment 1116 to switch to an "open" state, thereby permitting the passage of the water through sixth water line segment 1116 and into second water supply pump 1130*b* and towards seventh water line segment 1117. When fifth water line segment 1115 is ready to come back "online", then PLC 1400 provides a signal to the valves disposed in sixth water line segment 1116 to switch to a "closed" state, and PLC 1400 provides another signal to the valves disposed in fifth water line segment 1115 to switch to an "open" state. In other embodiments, water flows through both fifth water line segment 1115 and sixth water line segment concurrently.

Water flows through seventh water line segment 1117 and towards outlet 1110*b* and eductor mixing device 1300. Seventh water line segment 1117 comprises a plurality of instruments including one or more pressure difference monitors, one or more flow meters, and one or more valves. If the one or more pressure monitors detect a water pressure in seventh line segment that exceeds a pre-defined maximum value or is below a pre-defined minimum value, then PLC 1400, by means known in the art, provides signals to appropriate components through water line 1110 for the purpose of appropriately adjusting the detected pressure difference within seventh water line segment 1117. If the one or more flowmeters detect a water flow rate that exceeds a pre-defined maximum value or is below a pre-defined minimum value, then PLC 1400, by means known in the art, provides signals to appropriate components through water line 1110 for the purpose of appropriately adjusting the water flow rate within seventh water line segment 1117.

Water exits water line 1110 through outlet 1110*b* and into eductor mixing device 1300.

Concurrently with water flowing through water line 1110, dry polymer for use as an ingredient of a mother solution (in other embodiments, more generally, a dry material) is delivered into conduit 1210*d* from bulk tankers "A", and conveyed into containing unit 1220 through conduit 1210*d*. Dry polymer is moved through conduit 1210*d* by first conveying unit 1210. PLC 1400 controls the settings of first conveying unit 1210, and such control dictates the speed and volume at which dry polymer moves through conduit 1210*d*.

Dry polymer exits an egress of conduit 1210*d* and into containing unit 1220, and accumulates within containing unit 1220. Level gauges 1220*a* monitor the amount of dry polymer accumulating in containing unit 1220 and the height to which dry polymer has accumulated in containing unit 1220. For example, if a level gauge 1220*a* detects that a height to which dry polymer has accumulated in containing unit 1220 has exceeded a pre-determined maximum height, or that the amount of dry polymer accumulated in containing unit 1220 has exceeded a pre-determined maximum weight, then PLC 1400 signals to first conveying unit 1210 to stop conveying dry polymer through conduit 1210*d* and into containing unit 1220. One or more vibrators 1220*b* also assist in providing an even distribution of dry polymer in the containing unit 1220. One or more vibrators 1220*b* also work with dust extraction unit 1220*c*, operating by negative pressure, to render dry polymer dust airborne within containing unit 1220 so that it may be introduced by negative pressure into dust extraction unit 1220*c*. Through conduit 1220*d*, dust extraction unit 1220*c* then returns such dry polymer dust back into second sub-system 1200 at second conveying unit 1240.

Dry polymer is conveyed from containing unit 1220 into feeder unit 1230 through a conduit (un-numbered) connecting containing unit 1220 to feeder unit 1230. The flow of dry polymer through the conduit is determined by the operational setting (e.g. "open", "closed", "half open") of the valve (e.g. ball valve), as controlled and monitored by PLC 1400. Dry polymer is moved through feeder unit 1230 and into second conveying unit 1240, and, by pneumatic means, the dry polymer is directed to eductor mixing device 1300 from second conveying unit 1240.

Eductor mixing device 1300 receives dry polymer from second conveying unit 1240 and water from water line 1110 by means of negative pressure. The operations of an eductor mixing device is known in the art, and described in U.S. Pat. No. 4,186,772 to Handleman et al., U.S. Pat. No. 4,884,925 to Kemp et al., and U.S. Pub. No. 2005/0111298 to Lott. By using an eductor mixing device in system 1000, a polymer solution with high dry polymer concentration (up to about 90% active polymer) can be created. This can be compared with industry standards of polymer emulsion comprising about 30% to 35% active polymer.

The produced mother solution is delivered into tank assembly 1310, and permitted to "mature" therein. If an excess of mother solution is delivered into tank assembly 1310, then the excess mother solution is removed from tank assembly 1310 through overflow pipe 1314. Overflow pipe 1314 is connected to sewage outlet "S" or an external holding tank (not shown).

The produced mother solution is introduced from tank assembly 1310 to first transfer pump 1320 and second transfer pump 1330 via a conduit which comprises a first portion that feeds into first transfer pump 1320 and a second portion that feeds into second transfer pump 1330. Should the flow of mother solution into either first transfer pump 1320, second transfer pump 1330, or both be above or below a pre-determined optimal flow range as monitored by PLC 1400, then the state (e.g. "closed", "open", "half-open", "quarter-open") of the valves (e.g. disc valves) disposed in the conduit is adjusted accordingly by PLC 1400.

As contemplated in this embodiment, first transfer pump 1320 and second transfer pump 1330 can serve as "backups" for one another in the event that one of them needs to be taken "offline". That being said, and as contemplated in this embodiment, first transfer pump 1320 and second transfer pump 1330 are different in that first transfer pump 1320 is a low pressure pump that is connected to a blender system 1360 and that second transfer pump 1330 is a high pressure pump that can be connected to either a blender system 1360 or directly into a missile system 1350 for downhole application. Advantageously, system 1000 which comprises a dual functionality of a low pressure transfer pump 1320 and a high pressure transfer pump 1330 permits an operator to seamlessly transition from one application (combination with a blender system) to another application (combination with a missile system) in the field without added equipment.

Mother solution is extruded from first transfer pump 1320 and into conduit 1320*a*. The fluid pressure of mother solution exiting first transfer pump 1320 is determined by pressure gauge 1320*b*. If the pressure is above or below a pre-determined suitable operational pressure range, then PLC 1400 adjusts the settings of the system 1000 to bring the pressure back within the suitable operational pressure range. The flow rate of mother solution through conduit 1320*a* is also monitored by flow meter 1320*c*. If the flow rate is above or below a pre-determined suitable operational flow rate, then PLC 1400 adjusts the settings of the system 1000 to bring the flow rate back within the suitable range.

Mother solution is extruded from second transfer pump 1330 and into conduit 1330*a*. The fluid pressure of mother solution exiting second transfer pump 1330 is determined by pressure gauge 1330*b*. If the pressure is above or below a pre-determined suitable operational pressure range, then PLC 1400 adjusts the settings of the system 1000 to correct the pressure and lower it to within range of the suitable operational pressure range. The flow rate of mother solution through conduit 1330*a* is also monitored by flow meter 1330*c*. If the flow rate is above or below a pre-determined suitable operational flow rate, then PLC 1400 adjusts the settings of the system 1000 to bring the flow rate back within the suitable range.

In other embodiments, both conduits 1320*a* and 1330*a* are connected to a blender unit 1360 and missile unit 1350. The flow of mother solution into the blender unit, missile unit, or both, is controlled by PLC 1400.

The blender unit 1360 receives and mixes mother solution and sand together in a desired ratio to form a polymer hydraulicfracturing fluid. Such fracturing fluid is then delivered into a missile unit 1350 for injecting fracturing fluid downhole. In some embodiments, the blender unit is not used, and mother solution is the polymer hydraulic fracturing fluid. In such embodiments, mother solution is introduced directly into the missile system from either conduit 1320*a* or conduit 1330*a*.

General

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. A hydraulic fracturing system comprising:
   (a) a tank assembly comprising an ingress, an egress, and an interior volume for collecting mother solution;
   (b) a first transfer pump coupled with the egress of the tank assembly; and
   (c) a second transfer pump coupled with the egress of the tank assembly;
   wherein the first transfer pump is coupled to a missile unit and a blender unit downstream thereof but is in fluid communication with only one of such units at any given time when coupled.

2. The system as claimed in claim 1, further comprising: (a) a first sub-system comprising an ingress and an egress, and configured to receive liquid medium; (b) a second sub-system comprising an ingress and an egress, and configured to receive particulate material; and (c) one or more mixing device, each one or more mixing device comprising (i) a first inlet coupled with the egress of the first sub-system, (ii) a second inlet coupled with the egress of the second sub-system, and (iii) an egress coupled with the ingress of the tank assembly.

3. The system as claimed in claim 2, the first sub-system comprising a plurality of line segments that are interconnected and for transporting liquid medium, at least two of such line segments being positioned in parallel to one another, at least two of such line segments being positioned in series to one another, and a first pump disposed along a first line segment that is a part of the plurality of line segments and a second pump disposed along a second line segment that is a part of the plurality of line segments, the first pump and the second pump being positioned in parallel to one another.

4. The system as claimed in claim 3, each of the line segments comprising one or more valves for regulating the flow of liquid medium therethrough.

5. The system as claimed in claim 3, the first sub-system further comprising a first filter disposed in a third line segment that is a part of the plurality of line segments and a second filter disposed in a fourth line segment that is a part of the plurality of line segments, the first filter and the second filter being positioned in parallel to one another.

6. The system as claimed in claim 2, the second sub-system comprising: (a) a containing unit comprising an ingress and an egress; (b) a feeder unit comprising an ingress that is in fluid communication with the egress of the containing unit via a conduit; and (c) a conveying unit in fluid communication with an egress of the feeder unit.

7. The system as claimed in claim 6, the containing unit further comprising: (a) a level meter for controlling the volume of particulate material passing through the egress of the containing unit and into the feeder unit; and (b) a vibrator for agitating particulate material that is contained in the containing unit.

8. The system as claimed in claim 6, wherein the feeder unit is a screw feeder.

9. The system as claimed in claim 6, wherein the conveying unit is a pneumatic conveying unit.

10. The system as claimed in claim 6, wherein the conveying unit is in fluid communication with a dust collection unit, the dust collective unit for receiving any particulate material that is not received into the feeder unit.

11. The system as claimed in claim 6, wherein the mixing device is coupled with the conveying unit.

12. The system as claimed in claim 6, wherein an interior surface of one or more parts of the second sub-system is coated with a non-stick coating.

13. The system as claimed in claim 6, wherein one or more parts of the second sub-system is coupled to a heating device.

14. A method of operating the system as claimed in claim 2, the method comprising:
   (a) receiving liquid medium in the first sub-system;
   (b) receiving particulate material in the second sub-system;
   (c) transporting liquid medium and particulate material into the mixing device;
   (d) mixing liquid medium and particulate material to form the mother solution; and
   (e) transporting the mother solution to the first transfer pump, the second transfer pump, or both.

15. The system as claimed in claim 1, the tank assembly comprising a liquid level meter for regulating the volume of mother solution flowing towards the first transfer pump, the second transfer pump, or both.

16. The system as claimed in claim 1, wherein the first transfer pump and the second transfer pump each operates at a pressure between 0 and 150 PSI.

17. The system as claimed in claim 1, further comprising a programmable logic controller configured to control the system and functionality thereof.

18. The system as claimed in claim 1, the second transfer pump for coupling is coupled to the missile unit and the blender unit downstream thereof but in fluid communication with only one of such units at any given time when coupled.

19. The system as claimed in claim 1, further comprising a solution buffer tank for holding an excess of mother solution, wherein the solution buffer tank is coupled to the tank assembly and can be in fluid communication with the interior volume of the tank assembly.

20. The system as claimed in claim 19, the tank assembly further comprising an overflow pipe that can be in fluid communication with an interior volume of the tank assembly and the solution buffer tank.

* * * * *